UNITED STATES PATENT OFFICE.

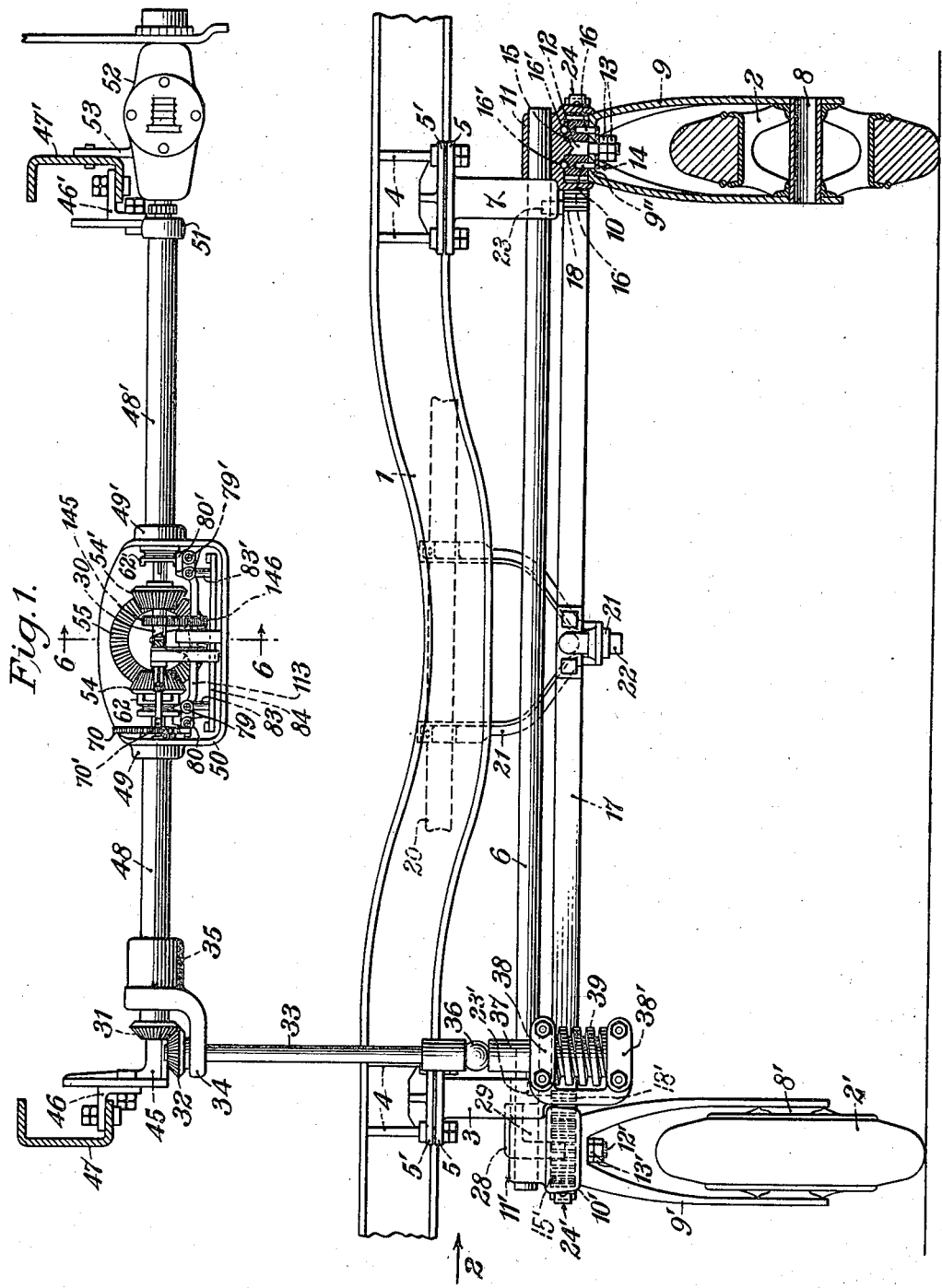

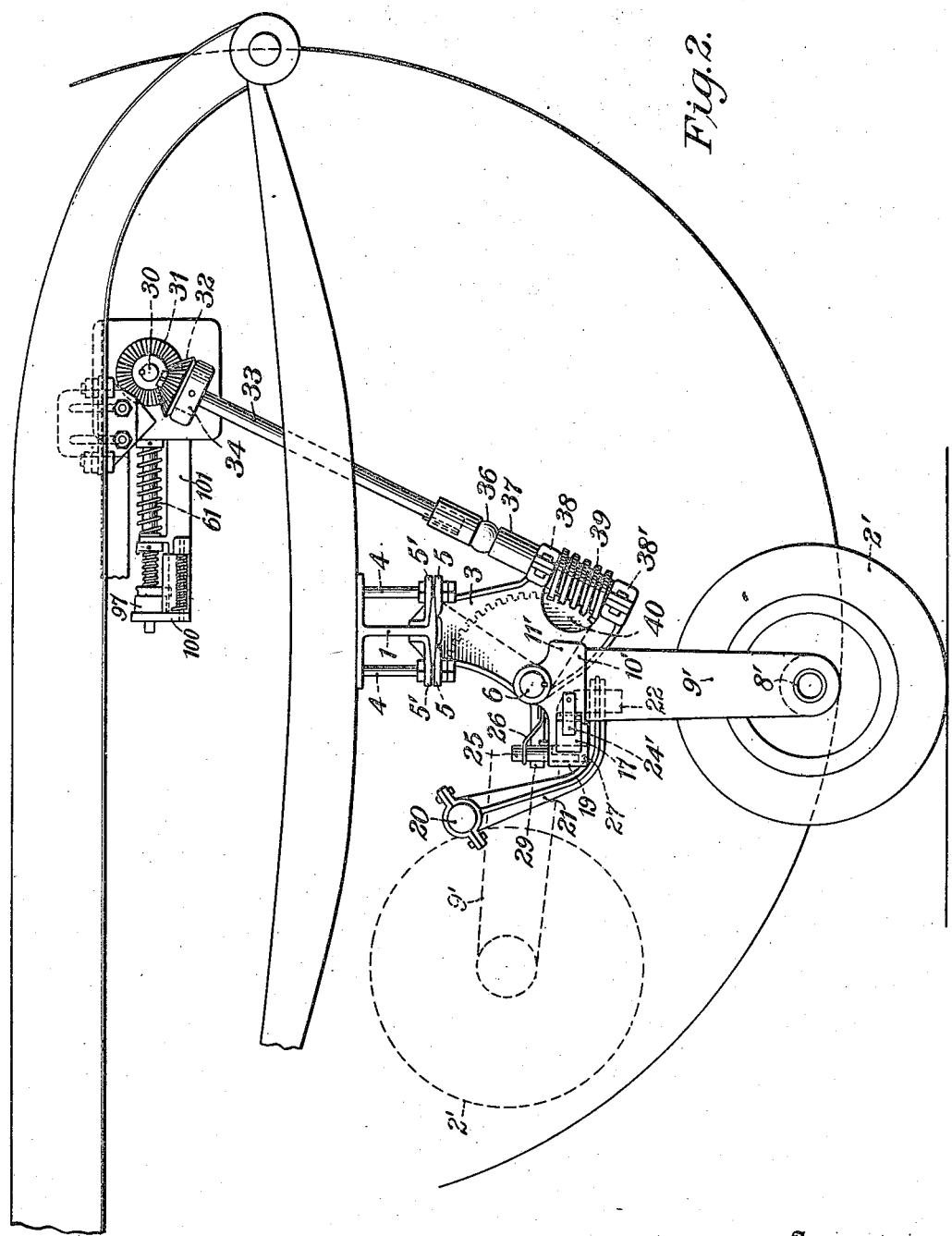

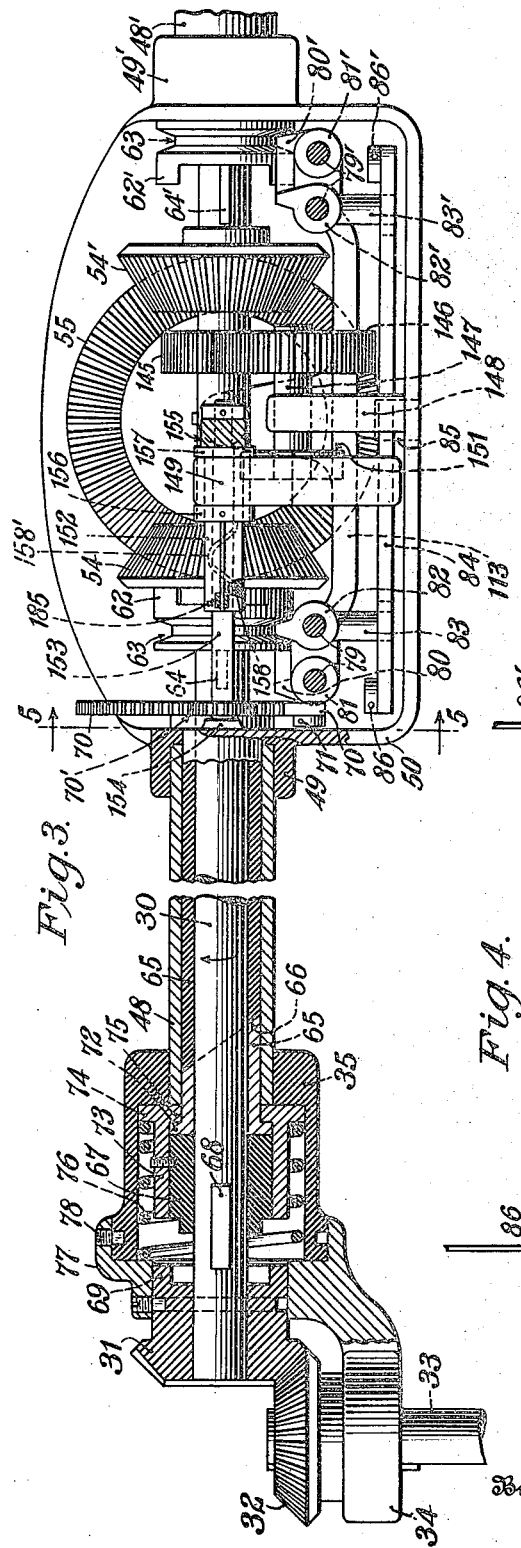
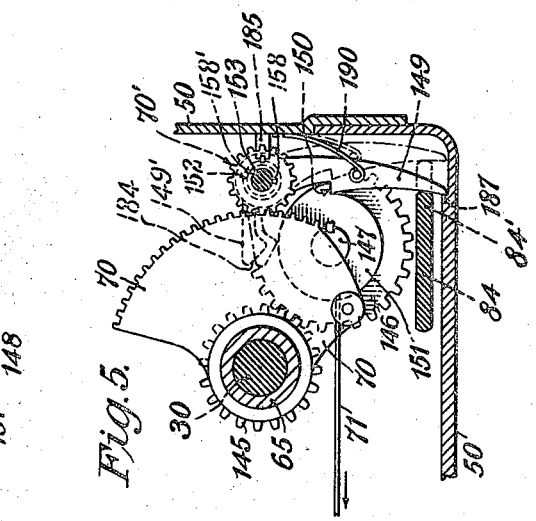
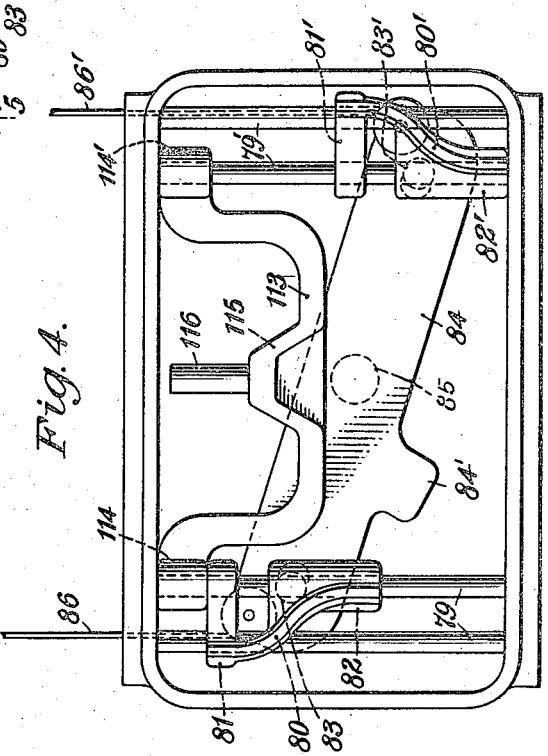

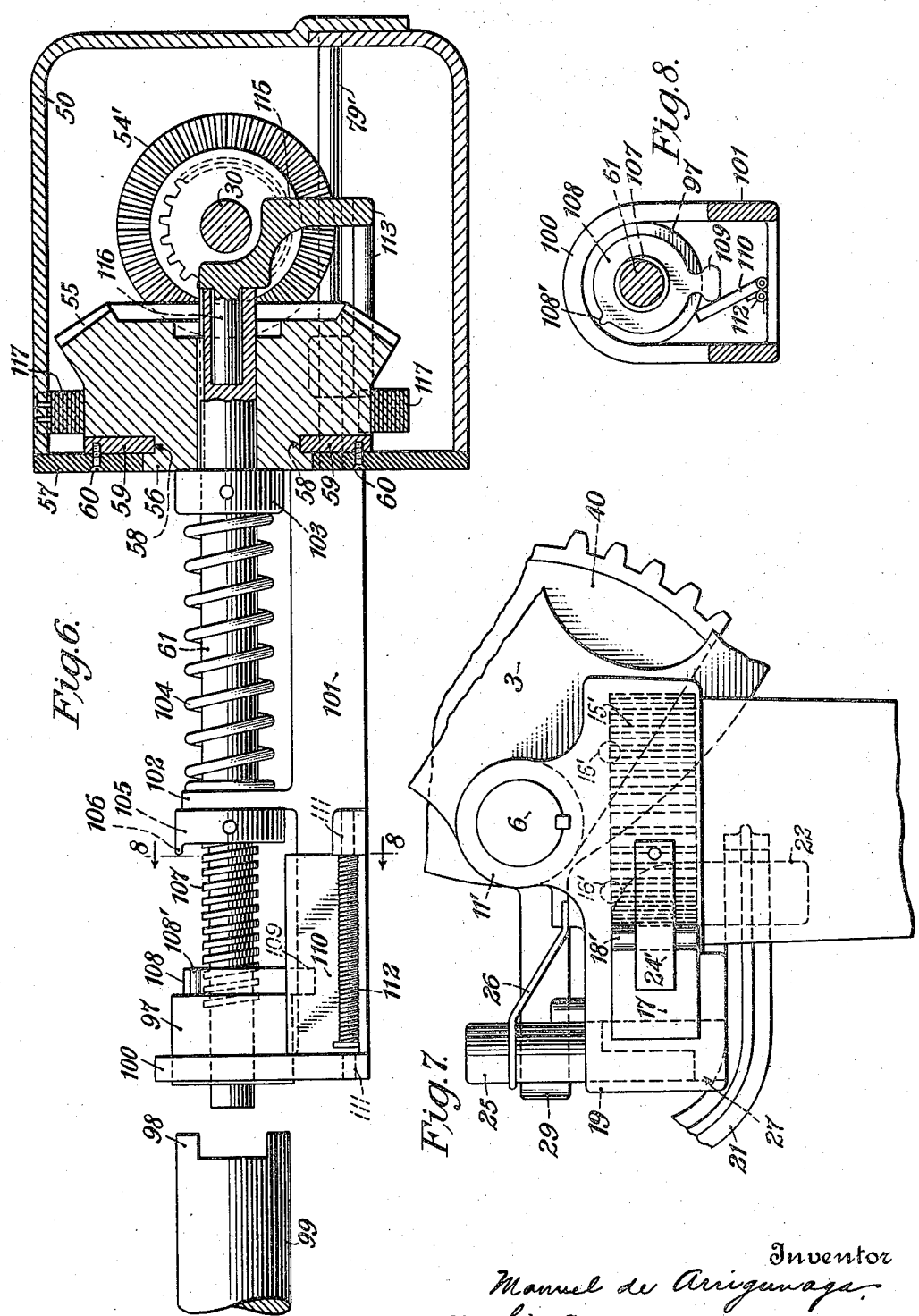

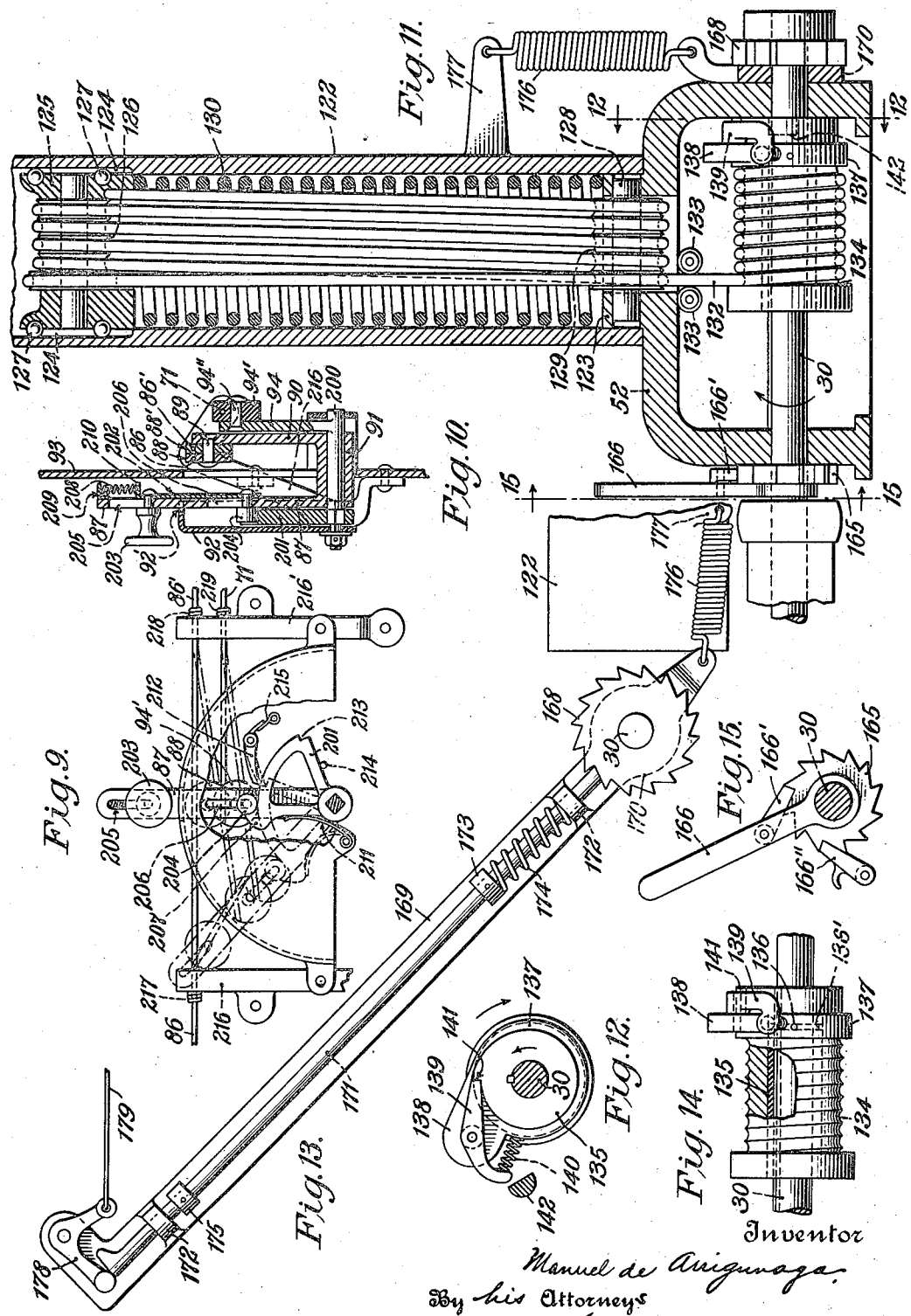

MANUEL DE ARRIGUNAGA, OF NEW YORK, N. Y.

MOTOR-VEHICLE.

1,276,335.     Specification of Letters Patent.     Patented Aug. 20, 1918.

Continuation of application Serial No. 190,289, filed September 8, 1917. This application filed April 17, 1918. Serial No. 229,020.

*To all whom it may concern:*

Be it known that I, MANUEL DE ARRIGUNAGA, a citizen of the Republic of Mexico, formerly residing in Mérida, in the State of Yucatan and Republic of Mexico, but now residing in the borough of Manhattan, in the city, county, and State of New York, have invented certain new and useful Improvements in Motor-Vehicles, of which the following is a specification.

My invention relates to motor vehicles, and the particular features intended to be covered by this application relate more particularly to auxiliary steering apparatus, to means for operating the same, and to a related starting device.

The apparatus herein shown and described is a further development of my improvement upon auxiliary steering apparatus shown and described in United States Letters Patent, Reissue No. 14,348, granted to me on September 4, 1917, for auxiliary steering device.

This application is a continuation of my copending application, Serial No. 190,289, filed September 8, 1917, and entitled Motor vehicles.

One of the objects of my invention is to provide a durable and efficient auxiliary steering apparatus.

Another object of the invention is to provide one or more steering wheels adapted to be lowered by a suitable motor device and means for connecting and disconnecting said motor device and auxiliary steering wheels.

Another object of the invention is to provide suitable apparatus by means of which the driver may control the raising and lowering of the wheels.

Another object of the invention is to provide suitable clutch mechanism under the control of the driver for utilizing the driving motor of the vehicle for raising and lowering said wheels.

A further object of the invention is the provision of a suitable starting device for said motor, and means whereby the same may be connected through the said clutch mechanism for starting the motor.

Further objects and advantages of the invention will more fully appear from the following description taken in connection with the accompanying drawings illustrating the preferred embodiment of my invention.

My invention consists in the novel features of construction and combination of parts hereinafter more fully described and more particularly pointed out in the appended claims.

Referring to the drawings,

Figure 1 shows a front elevation of a part of the front axle and a part of the frame of the car with the said embodiment of the invention applied thereto, with certain of the parts shown in section;

Fig. 2 shows a side view of the apparatus of Fig. 1, looking in the direction of the arrow 2 on Fig. 1;

Fig. 3 is an enlarged front view of the gear mechanism and part of the other apparatus shown in the upper part of Fig. 1, with certain parts in section;

Fig. 4 is a plan view of certain parts of the control mechanism in the gear housing, for controlling the gear mechanism shown in Fig. 3;

Fig. 5 is an enlarged detail taken on line 5—5 of Fig. 3, showing means for controling the starter, and with certain parts broken away;

Fig. 6 is an enlarged view of the clutch mechanism shown at the upper portion of Fig. 2 with some of the parts omitted, the gear housing and mechanism being shown in section, taken on line 6—6 of Fig. 1;

Fig. 7 is an enlarged view of a part of the supporting frame for the auxiliary steering wheel as shown in Fig. 2, and of a part of the gearing for rotating same;

Fig. 8 is a section taken on line 8—8 of Fig. 6 showing a detail of the clutch-controlling mechanism;

Fig. 9 is a front view of the control levers and co-acting mechanism for governing the lowering and raising of the auxiliary steering wheels and for controlling the starter;

Fig. 10 is a central vertical sectional view of the same;

Fig. 11 shows an enlarged plan view, partly in section, of the starting apparatus shown at the upper right-hand corner of Fig. 1;

Fig. 12 shows a section of a part of the same, taken on line 12—12 of Fig. 11;

Fig. 13 shows auxiliary apparatus for starting the engine to be operated manually;

Fig. 14 shows details of part of the starter; and

Fig. 15 is a view taken on line 15—15 of Fig. 11 showing a part of the starter.

Referring to the drawings (Figs. 1 and 2), 1 represents the front axle of a motor-driven vehicle from which the auxiliary steering wheels 2, 2' are suitably supported so as to be lowered to the ground to lift the adjacent main wheels of the vehicle, whereupon said auxiliary wheels 2, 2' through suitable mechanism hereinafter described, are turned to steer the vehicle, after which they may again be raised to their normal position. The wheels are so arranged and constructed and connected with the usual steering wheel that the vehicle can be more sharply turned by operation of the ordinary steering wheel than is the case where the regular front or adjacent wheels of the vehicle are used for steering.

The wheels are supported and operated in the preferred form of my invention as herein shown, as follows:

Preferably at the left-hand side of the axle there is secured a depending rigid frame 3 bolted in any suitable manner, such as by bolts 4 and flanges 5, 5', to the axle 1. This frame has a transverse opening or bearing for receiving a transverse shaft 6, the other end of which is journaled in another depending frame 7 secured to the front axle in the manner described with respect to frame 3. The auxiliary wheels 2, 2' are supported from this shaft in the following manner: Referring to the wheel shown in cross-section at the lower right-hand side of Fig. 1, it will be seen that the wheel 2 is rotatably mounted on a horizontal axle 8 carried by a forked frame 9 the upper end of which is adapted to fit rotatably within an annular flange 10 formed at the lower end of supporting frame 11 keyed to the shaft 6. The forked frame is rotatably secured to the supporting frame 11 by means of a central extension 12 of the frame 11, which extension passes through the upper portion 9'' of the forked frame, and is provided with threads for receiving nuts 13 that are screwed in place against a suitable washer 14. The chamber between the said annular flange 10 and the portion 9'' of the forked frame is provided with a pinion 15 that is rigidly held to the said portion 9'' by means of suitable dowel pins 16. Ball bearings 16' are provided between the upper face of said pinion and the upper surface of the chamber inclosing the pinion, so that the pinion and the forked frame carrying the wheel may be readily turned about the depending bolt member 12 which serves as the journal or vertical axis about which the said pinion and wheel are turned. The left-hand wheel is similarly constructed and supported on the opposite end of the shaft 6.

The wheels are turned about the said vertical axes 12, 12' by means of a transverse rack bar 17 (see more particularly Figs. 1 and 7) having teeth 18, 18' cut near the ends thereof and adapted to mesh with the said pinions 15, 15'. This rack is slidably supported at its left-hand end in a bracket 19 extending rearwardly from the lower portion of the supporting frame 11' (see Fig. 7) which holds the rack firmly in mesh with the pinion 15'. The other end of the rack bar is similarly supported by the supporting frame 11.

It is desirable to turn or swing the wheels about their vertical axes 12, 12' when they are on the ground, by means of the usual steering wheels, and in order to do this I provide means for connecting said rack bar 17 with the ordinary transverse steering rod 20 when the wheels are lowered, and for disconnecting the same when the wheels are raised. For this purpose (see Figs. 1, 2 and 7) I mount centrally of the steering bar 20 a somewhat U-shaped bracket 21 projecting downwardly and forwardly, the arms or forks of the extreme end of the bracket forming between them a narrow slot adapted to receive a pin 22 extending downward from said rack bar. As the wheels are lowered by mechanism hereinafter described, they swing from the dotted-line position shown in Fig. 2, to the full-line position shown, and in swinging through this arc, said pin 22 is caused to move into a narrow slot formed at the extremity of the projecting bracket 21, whereupon, if the steering wheel is moved to shift the steering rod 20, the pin and rack bar 17 are also shifted to an equal extent. The size of the pinions 15, 15' is such that with the usual throw of the transverse steering rod 20, the wheels 2, 2' will be turned about their vertical axes 12, 12' through a much greater angle than the regular steering wheels will be turned; so that while said regular wheels are only turned through the usual arc allowed, the auxiliary wheels are turned much more sharply.

Suitable pins 23, 23' are provided for limiting the throw of the rack 17, and suitable means, such as springs 24, 24' are provided for returning the rack to its central or neutral position after the wheels have been raised to disengage the pin 22 from the slot in the bracket 21. It is desirable to lock the rack in its neutral position when the wheels are elevated to the position shown in dotted lines in Fig. 2; and for this purpose I provide a pin 25 (see Figs. 2 and 7) carried at the outer end of a spring 26 secured to the supporting frame 11'. The lower end of this pin 25 moves freely within a bore 27 at the rear of bracket 19, which bracket, forming a part of the supporting frame 11', swings about the axis of the shaft 6 with the wheels. The lower end of the pin 25 is half cut away, as shown, and the portion of the rack in register with the pin 25 when the rack is in its central or neutral position, is slotted to receive the pin; so that with the wheels raised and the rack moved to its central position, the spring 26 forces the pin into bore 27 and through the slot in the rack so as to hold the rack in its central position. When the wheels are lowered, as hereinafter described, a lateral extension 28 at the upper end of the pin (see Fig. 1) strikes a projection 29 extending from the stationary supporting frame 3, whereupon further lowering of the wheels causes the pin to be partly withdrawn from the bore 27 and sufficiently to release the rack 17, which is then free to be turned by manipulation of the steering wheels of the machine.

I will next describe the means by which the wheels are lowered and raised when the shaft 30 is rotated, and I will then describe the gear mechanism in housing 30, the apparatus for controlling the same and the clutch mechanism between the said gear mechanism and the engine.

Referring to Figs. 1, 2, 3, and 7, 30 is a shaft extending transversely of the vehicle above the front axle 1, suitably journaled as hereinafter described, and provided at its left-hand end with a bevel gear 31 meshing with bevel gear 32 keyed to inclined shaft 33 to rotate the same but to slide longitudinally thereof, said shaft having its upper end journaled in bracket 34 extending from a housing 35 hereinafter referred to. The shaft 33 (see Figs. 1 and 2) has its lower end keyed to a suitable universal joint mechanism 36 from the lower end of which extends a stub shaft 37 journaled in split brackets 38, 38' supported by stationary frame 3. This shaft has a worm gear 39 keyed thereto between the brackets 38, 38', and this worm is in mesh with a worm gear sector 40 which is keyed to the shaft 6. It will be seen from this construction that when the shaft 30 is rotated in one direction it will rotate the inclined shaft 33 to rotate the gear 40 and shaft 6 to which the wheel-supporting frames 11, 11' are also keyed, thereby causing the frames to be swung down until the wheels reach the ground, whereupon the rotation of the shaft 30 is stopped by suitable clutch mechanism hereinafter described. When the shaft 30 is rotated in the opposite direction the gear 40 is rotated to swing the wheels upward into the dotted line position shown in Fig. 2. As heretofore explained, during the downward swinging movement of the wheels, the pin 22 projecting downwardly from the rack bar 17 will engage in the narrow slot at the outer extremity of the bracket 21 extending downwardly and forwardly from the transverse steering rod 20; whereupon any movement of this steering rod will shift the rack and cause the wheels to be swung or rotated about their vertical axes 12, 12'.

I will now describe the arrangement and construction of the shaft 30, its supports, and the gearing for rotating the same. A supporting frame 45 (see Fig. 1) is bolted in any suitable manner, such as by bracket 46, to the side frame 47 of the chassis; and this supporting frame carries the housing 35 in the inner end of which fits one end of a sleeve 48 (see Fig. 3) the other end of which in turn fits within an annular socket 49 extending from the end of the housing 50. The opposite end of the housing has a similar socket 49' into which fits the inner end of a sleeve 48' the outer end of which is carried in a supporting socket 51 secured to the opposite side piece 47' of the chassis by a suitable bracket 46'.

The shaft 30 extends from the gear 31 through the sleeve 48, housing 50, sleeve 48', and through housing 52 (containing a starting device hereinafter more fully described) supported by bracket 53 in any suitable manner from the side piece 47'. The shaft 30 within housing 50 is provided with two bevel gears 54, 54' mounted loosely on the shaft, and these gears mesh with the main driving gear 55 mounted on the back of the housing 50 (see Fig. 6), as follows: The hub of the main gear 55 has its rear end 56 loosely fitting an opening in the rear wall 57 of the housing 50, and adjacent the portion 56 the hub is provided with an annular groove 58 into which is loosely fitted a split ring 59 secured to the rear wall of the housing by screws 60; and this main gear is driven from the motor by shaft 61, as hereinafter described.

Referring again to Fig. 3, the hub of the gear 54 constitutes a clutch member adapted to be engaged by a clutch member 62 carried by an annular frame keyed to the shaft 30 to slide back and forth thereon. This clutch member is provided with an annular groove 63 by means of which the clutch member is forced back and forth along the key 64 to engage and disengage the hub of gear 54. A similar clutch device is keyed on the shaft 30 to engage and disengage the hub of gear 54' and these clutch members are operated by the control mechanism hereinafter referred to, for clutching one or the other of the gears 54, 54' to the shaft 30, according to the desired direction of rotation of the shaft.

At the left-hand side of the housing 50, and between the shaft 30 and the sleeve 48, there is provided an inner divided sleeve 65. The sleeve is divided on the transverse diagonal line 66, the object being that when the inner end of the sleeve is rotated the adjacent inclined surfaces of the two portions of the sleeve will cause the left-hand or shorter portion of the sleeve to be moved outwardly to cause the clutch member 67 splined to the shaft by key 68, to be moved outwardly into engagement with a socket in the hub 69 of the bevel gear 31 to rotate the same. The inner end of the sleeve 65 is oscillated about the axis of the shaft 30 by means of a member 70 (see Figs. 3 and 5) having an operating wire 71 extending to the dashboard of the vehicle, as hereinafter described. The provision of this split sleeve is unnecessary so far as concerns the raising and lowering of the wheels by the motive power of the engine, but it is rendered necessary in view of the operative relation of the self starter to the shaft 30 and the engine as hereinafter described. The split sleeve is for the purpose of disconnecting the shaft 30 from bevel gear 31 when it is desired to start the engine.

Referring again to the clutch member 67 within the housing 35, the clutch member abuts at its inner end against a flange 72 on the end of the short section of the sleeve 65, and the clutch is rigidly secured to a sleeve 73 having an outwardly extending flange 74 and an inwardly extending flange 75. A compression spring 76 is provided between the outwardly extending flange 74 and the inner surface of a sleeve 77 secured to the housing 35 by means of pins 78, while the inner flange 75 extends back of the flange 72 on the short section of sleeve 65. With this construction, when sleeve 75 is rotated, the inclined surfaces will cause the short section of the sleeve to be moved outward since this section is held from rotation due to its connection with the clutch member 67 and sleeve 73. As the short section of the sleeve is moved outward it carries with it the clutch and sleeve 73. When sleeve 65 is permitted to assume its normal position shown in Fig. 3, the spring 76 forces the sleeve 73, clutch member 67 and short section of sleeve 65 back into the position shown. From this it will be seen that the rotation of neither of the gears 54 or 54' will drive bevel gear 31 unless sleeve 65 is rotated to throw clutch member 67 into engagement with hub 69 of the gear 31, and that when sleeve 65 is rotated for this purpose then the auxiliary steering wheels will be lowered or raised according to which of the gears 54 or 54' is clutched to the shaft through their respective clutch members 62, 62'.

I will now describe the means for operating these clutch members by the control mechanism. The casing 50 is provided near each end and just below the said clutch members with transverse guide rods 79, 79' (see Figs. 3 and 4). On the rods 79 there is slidingly mounted a cam member 80 having sleeves 81, 82 for slidingly fitting the guide rods so that the cam can be slid back and forth thereon. The guide rods 79' at the opposite end of the casing are provided with a similar cam member 80' similarly mounted. The cam member 80 projects into the groove 63 on the clutch member 62, and the cam member 80' has a similar projection extending into the groove 63' of clutch member 62'. The cam members 80, 80' are connected, respectively, by downward projections 83, 83' to an actuating link 84 having a short projection 85 extending through the floor of the housing and about the axis of which the link is swung to move the cam members back and forth on the guide rods for operating the clutch members 62, 62'. The actuating link is operated by pull wires 86, 86' running to the dash, where they are secured to control lever 87 (see Figs. 9 and 10). As shown, the wires 86, 86' are secured to the peripheral portions of disks 88, 88' which are rotatably mounted on a short stub shaft 89 carried by a lever 90 projecting from hub 91 of the lever 87, but the wires may be connected in any other suitable way to the lever 87. The lever 87 is made out of some suitable spring metal so that it is normally held up in a recess 92' in the flange of the guard 92, but when it is desired to move the lever, it is forced toward the dash 93 so as to free it from the said recess, whereupon it may be moved in either direction. When brought back to the neutral position and released, the lever will spring back into the recess 92'. The lever 94 is for the purpose of rotating the sleeve 65 to close or open clutch 67—69 at the end of the shaft 30, the said lever being connected to wire 71, as by the disk 94' mounted on the stub shaft 94" projecting from lever 94.

When using my improved auxiliary steering apparatus, it is necessary to operate one of the clutch members 62, 62', and also the clutch 67—69, whereas in using the starting mechanism, one of the clutch members 62, 62' is operated, but the clutch 67—69 is not. To this end I provide a construction whereby the shifting of the lever 87 may be caused either to shift both the wires 86, 86' and wire 71, or to shift wires 86, 86' alone. In accordance with this construction the lever 94 projects from the rear of and turns with a short shaft 200 which extends axially through and supports the hub 91 of the lever 87, the said shaft carrying at its forward end a sector shaped member 201, which is connected with the shaft so as to rotate therewith. On the rear of the lever 87 is mounted a slide 202, which is connected to lever 87 by buttons 203 and 204 provided with shanks extending through longitudinal slots 205 and 206 and secured to the slide 202. The button 204, when in its lower position, as shown, is adapted to engage a projection 207 on sector 201, so that by movement of the lever 87 to the left from the solid line position, referring to Fig. 9, the sector 201 and the parts connected therewith will likewise be moved in the same direction. The slots 205 and 206 are of sufficient length to permit the button 204 to be raised sufficiently to clear the top of the projection 207 and to ride over the pawl 212, as hereinafter described. The slide 202 is normally yieldingly held in its lower position, as by means of spring 208 arranged between projections 209 and 210 on the lever 87 and slide 202 respectively. Spring 211 tends to move sector 201 from its dotted line position to the right, referring to Fig. 9, and to hold projection 207 in engagement with button 204. Sector 201 is adapted to be held in its left hand or dotted line position in Fig. 9 by means of a pawl 212, the lower end of which is adapted to engage a notch 213 in the sector 201. The pawl 212 is disengaged from the sector 201 by moving the lever 87 to the right, referring to Fig. 9, whereupon button 204 rides up on the said pawl, and drops down again when it clears the right-hand end of the pawl; so that when the lever 87 is again moved to the left to its central position, the button 204 will engage the under side of the said pawl, and wedge the latter out of the notch 213, whereupon the sector 201 will be returned to its normal position by spring 211. A stop 214 is provided to prevent the movement of the sector to the right beyond its normal position. The pawl 212 is yieldingly pressed toward operative position with respect to the sector 201, as by the spring 215. The numerals 216 and 216′ represent guides for wires 86, 86′ and 71 as shown, which wires may be covered by flexible protective sleeves 217, 218 and 219 respectively, parts of which sleeves are shown in Fig. 9. The operation and use of the above described control mechanism will be referred to more fully hereinafter.

I will now describe the mechanism for connecting and disconnecting the engine with respect to the main gear 55, and the means for controlling the same. Referring to Figs. 2, 4 and 6, and more particularly to Fig. 6, it will be observed that the forward end of shaft 61 extends slidingly through the main gear 55, which is suitably keyed to the shaft, and that the gear 55 is held rotatably in position on the housing by the aforementioned divided ring 59. It will also be understood that if desired, any suitable anti-friction bearing may be provided in place of this simple ring, which is shown for the sake of simplicity. The rear end of the shaft is provided with a clutch member 97 adapted to engage clutch 98 on the engine shaft 99. The clutch member 97 at the rear end of the shaft 61 is adapted to slide back and forth through an upwardly extending bracket 100 carried by a horizontal supporting frame 101 suitably secured to the rear of the differential housing 50 (and reinforced if desired in any suitable manner). This frame 101 is also provided with an intermediate bracket 102 having an opening through which the shaft 61 slidingly fits. The shaft has a collar 103 rigidly secured thereto, and between this collar and the bracket 102 there is provided a compression spring 104 tending to thrust the shaft forward to disconnect the clutch members 97, 98. The shaft is further provided with a second collar 105 rigidly secured to the shaft and having a lateral projection 106 for purposes hereinafter mentioned. The shaft is also provided with threads 107 between this collar and the clutch member 97, and there is threaded on this portion of the shaft a nut 108 adapted to travel back and forth on the threads 107 as the shaft is rotated. The collar, nut and thread constitute a part of the means for automatically disconnecting the motor after the steering wheels have been moved up or down, as hereinafter described. The nut 108 is provided with a depending lug 109 extending below the top of a locking plate or latch 110 secured to a shaft 111 suitably pivoted at each end in the main supporting frame 101. A coiled spring 112 tends to throw the plate in a vertical position. This plate extends upwardly toward the shaft 61 a sufficient height so that when the shaft 61 is thrown backward to move clutch member 97 beyond the rear end of the latch plate, the latch plate, then in its upright position, extends above the lower edge of the clutch member so as to prevent the spring 104 from moving shaft 61 forward to release the clutch members until the said latch or plate is tripped.

The following control apparatus is provided for forcing the shaft 61 rearwardly to engage the clutch members 97, 98. Referring to Fig. 4, it will be observed that there is also provided in the housing 50 just above the actuating link 84, a member 113 the arms of which are provided with sleeves 114, 114′ adapted to slide along the inner guide rods 79, 79′ so that the member 113 may be moved across the housing guided on said rods. The sleeves 114, 114′ are adapted to be engaged by the inner ends of the sleeves 81, 81′ secured to the cam members 80, 80′, so that if either cam member is moved toward the rear of the casing by its pull wire, one or the other of the sleeves 114, 114' is engaged, thus causing the slide member 113 to be moved rearwardly with the said cam member. This slide member 113 is provided with an upwardly extending bracket 115 (see Figs. 4 and 6) having a centering pin 116 carried at its upper end adapted to fit into the bored-out forward end of the shaft 61 when the slide member 113 is moved to the rear of the casing. By this mechanism whenever one of the pull wires 86 or 86' is operated to move one of the cam members 80 or 80', the slide member 113 is moved rearwardly of the casing 50, and as the upper end of the bracket 115 engages the forward end of shaft 61, it forces the shaft rearwardly against the compression of spring 104, engaging clutch members 97, 98 to clutch the shaft to the engine. The construction and movement of the slide member 113 and of the cam members 80, 80' are preferably such that the cam member operates to clutch the bevel gear to the shaft 30 before the shaft 61 is thrust rearwardly to close the clutch 97—98 to the engine shaft for rotating the shaft 30.

In order to reverse the rotation of shaft 61 after the engine has been unclutched for purposes hereinafter described, the coiled spring 117 is secured at one end to the hub of the main bevel gear 55, and at its other end to the housing 50.

I will now describe the operation of the apparatus for lowering the wheels to the ground.

If the driver of the car finds himself in a narrow street, or other location where he desires to turn the car more sharply than he could if the main steering wheels were down, he pulls lever 87 to the left (see Fig. 9) while maintaining button 203 in its lowermost position, thus pulling on wire 71 connected to member 70 on sleeve 65 (see Figs. 3 and 5), causing the adjacent portion of said sleeve to be rotated about its axis, thereby closing clutch 67—69 to connect bevel gear 31 to the shaft 30, and at the same time pulling on wire 86' and drawing cam member 80' to the rear of the casing 50, which in turn closes the clutch 62', for connecting bevel gear 54' to the shaft 30 (see Figs. 9, 10, 5, 4 and 3). The pull on wire 86' also causes the sliding frame 113 to move rearwardly, thus thrusting the clutch shaft 61 (see Fig. 6) rearwardly against spring 104 to close clutch 97—98 to the engine, whereupon the shaft 30 is driven from the engine in the direction indicated, to lower the wheels to their vertical position. The minute that the clutch members 97—98 became engaged to cause clutch shaft 61 to rotate, the nut 108 being held from rotation by engagement of its depending portion 109 with the latch 110, immediately commenced to travel forward on the threads 107. These threads are so chosen that the moment that the auxiliary steering wheels reach their vertical position, the said traveling nut 108 is brought up against collar 105, whereupon lateral projection 106 from said collar engages projection 108' from the nut and thereby knocks it around, causing the projection 109 of the nut to swing the locking plate 110 on its axis down against spring 112 until it clears the lower end of the clutch member 97, whereupon spring 104 immediately thrusts the shaft 61 forward into the position shown in Fig. 6, thereby unclutching the engine from the shaft 30 as soon as the wheels have been lowered to their vertical position. The forward movement of shaft 61 also thrusts slide member 113 forward in the housing 50, thereby forcing the said cam member 80' and actuating lever 84 to their neutral positions; the movement of lever 84 also forcing the control lever 87 to its neutral position. The lever 94, however, remains in its left-hand position being held there by engagement of the pawl 212 with the notch 213 in the sector 201 so that the clutch 67—69 remains closed. The driver then turns the vehicle, as heretofore explained, by simply manipulating the steering wheel. As soon as the sliding cam member 80' is thus thrown to its neutral position, it opens the gear clutch 62', whereupon the coiled spring 117 about the hub of the main bevel gear 55 rotates said gear in the reverse direction to that in which it is driven by the engine, whereupon the threaded nut 108 travels backward on thread 107 until it again reaches the position longitudinally of the threads 107 shown in Fig. 6, when the rotation of shaft 61 stops, and the clutch shaft and mechanism are again in position to be operated to be clutched to the engine shaft and to be automatically released therefrom after a predetermined number of revolutions. It will be seen that the coiled spring 117 is automatically wound up during the rotation of the clutch shaft both in lowering and raising the wheels.

When the vehicle has been turned and straightened out, the driver may raise the auxiliary steering wheels by simply swinging lever 87 to the right, pulling on wire 86 to throw the clutch member 80 and also the slide member 113 to the rear of the casing, thus closing clutch 62 and closing engine shaft clutch 97—98, whereupon the engine drives the shaft 30 in the opposite direction to raise the wheels. During this movement of lever 87, the button 204 rides over pawl 212 and finally, after it has cleared the right hand end of the said pawl, moves down again to its lowermost position. As soon as the wheels reach their raised position shown in dotted lines in Fig. 2, nut 108 will have traveled forward to engage projection 106, whereupon the latch 110 is again released for opening the engine clutch and for forcing the clutch shaft 61 forward to move the control lever 87 to its neutral position, whereupon the clutch 62 is also opened. This movement of the control lever to its neutral position causes the button 204 to wedge the pawl 212 upwardly whereby the sector 201 and lever 94 are released and returned by spring 211 to the solid line positions shown in Fig. 9, and the clutch 67—69 at the end of the shaft 30 is opened.

Having thus described the construction of the auxiliary steering wheels, their supports, and the means for lowering and controlling the lowering of the same, I will now describe the starting device used in connection with the engine.

Referring to Figs. 1 and 11, the supporting housing 52 carried by side frame 47', is provided at the sides with supporting bearings for the shaft 30; and extending horizontally from said housing there is a cylindrical casing 122 the end of which adjacent the housing is fitted over an annular flange 123 extending from the housing. The casing 122 is provided at its outer end with grooves or guideways 124, and within the casing there is provided a slide block 125 carrying a series of pulleys 126. Rollers 127 are mounted between the slide block and the casing to run in said grooves, so that the block may be guided back and forth in the casing. The housing adjacent the casing is provided with a stub shaft 128 secured to the housing by being passed through bores in the upwardly extending flange 123, and on this shaft are rotatably mounted a series of individually rotatable wheels or pulleys 129. Between the slide block 125 and the upper end of the flange 123 there is provided a relatively powerful compression spring 130 which exerts its force against the slide block 125 to move the same outwardly in the casing 122. The slide block is normally held against the compression of this spring by a suitable wire or rope 132 secured to the slide block and passing successively over one of the pulleys 129 on the shaft and over one of the pulleys 126 on the slide block, and finally passing between two guide rollers 133 secured to the housing, and from thence onto the drum 134 onto which it is wound and its end secured. This drum, as shown in Fig. 14, is rotatably mounted upon a sleeve 135 which in turn is keyed to the shaft 30 so as to rotate therewith, and free to slide back and forth thereon, and the drum is held from sliding off of the sleeve by any suitable means such as a pin 136 carried by the drum and co-acting with a circumferential groove 136' in the sleeve, so that the drum and sleeve may slide back and forth along shaft 30 during the winding of the rope on the drum when the spring is being compressed, and the unwinding of the rope from the drum when the spring is extending. The drum is provided with a flange 137 having a projection 138 upon which is pivotally mounted a dog 139 the nose of which is held pressed inwardly by spring 140 against shoulder 141 cut in the flange of the sleeve 135 so as to hold the drum and sleeve normally locked together from relative rotation. The housing is provided at its right-hand end, referring to Fig. 11, with an inner projection 142, so located that when the drum 134 is moved to its extreme position to the right (at which the spring would have been coiled to its desired extent), the projection will be in the path of rotation of the dog so as to strike the tail of the same to release the nose of the dog from the shoulder 141 and thus unlock the drum and sleeve to prevent overwinding of the spring, as hereinafter described.

Without considering for the present the mechanism for governing the starting device and its connection to the engine, it will be seen that with the spring compressed as shown in Fig. 11, if suitable means be provided for locking shaft 30, but for releasing the same when it is desired to start the engine, the extension of spring 130 will pull on the drum 134 which, being locked to the sleeve 135 by the dog 139, which sleeve is in turn keyed to shaft 30, will cause the shaft to rotate in the direction of the arrow shown in Fig. 11 to drive shaft 30 which, when clutches 62' and 97—98 are closed by the control mechanism heretofore described, will cause the engine to be turned over to start the same. During this movement the drum will move toward the left from the position shown in Fig. 11. It will be furthermore understood that when the engine is rotating the shaft 30 against the direction shown by the arrow in Fig. 11 for raising the auxiliary steering wheels, this movement will rotate drum 134 to compress spring 130, during which movement drum 134 is moved toward the position shown in Fig. 11; and if the rotation of shaft 30 should continue after the spring has been compressed to the desired extent, the drum 134 will be in the position shown in Fig. 11; and if the rotation is continued, the tail of dog 139 will strike projecting pin 142, releasing the nose of the dog from shoulder 141, thereby allowing the spring 130 to momentarily rotate the drum 134 in the direction shown by the arrow in Fig. 12, during which time the continued rotation of shaft 30 rotates sleeve 135 in the opposite direction as indicated by the inner arrow in Fig. 12. As a result of this, after the drum and sleeve have been rotated in opposite directions each for part of a revolution, the nose of the dog will again engage shoulder 141 to lock the sleeve and drum together; but if at this time shaft 30 is continuing to rotate, the tail of dog 139 will again be brought into engagement with projection 142, which will cause the drum and sleeve to be again released, and so on as long as shaft 30 continues to rotate after the spring has been completely compressed.

I will now describe the locking device for shaft 30 and the means for releasing the same when it is desired to start the engine from the starter. Referring to Figs. 3 and 5, it will be seen that within the housing 50 a gear 145 is keyed to shaft 30, and this gear meshes with gear 146 keyed to shaft 147 journaled on an upright frame or bracket 148 extending up from the floor of the said housing. These two gears are desirably chosen with the ratio of 1 to 1½, because the gears 55, 54' are chosen with the ratio of 1½ to 1, the object being that for every complete revolution of the engine shaft, the shaft 147 carrying gear 146 will make one complete revolution. Normally gear 146 and hence shaft 30 are held from rotation by a latch 149 adapted to engage ratchet-shoulder 150 formed on the cam 151, which is secured to the shaft 147. The latch is rotatably hung or swiveled on a sleeve 152 surrounding a shaft 153 which is rotatably supported by bearings 154 and 155 in the differential housing 50. The latch 149 is held against longitudinal movement on the sleeve 152, as by collar 156 and flange 157, and a suitable connection is provided between the shaft 153 and the sleeve 152 whereby on rotation of the said shaft the said sleeve and the latch 149 carried thereby are moved longitudinally of the shaft and laterally of the cam 151. As shown this result is obtained by providing shaft 153 with a pin 158 which fits in a spiral groove 158' in the sleeve 152, the latter being held against rotation by any suitable means such as a member 185 with which the sleeve has a splined connection. The latch 149 is provided with a rearwardly extending portion 149' arranged normally above the cam 151 and provided with an inclined surface 184 whereby the latch is adapted to be moved from inoperative into operative position by the nose of the cam 151 upon the rotation of the latter, as will be hereinafter more fully explained. The member 70 is in the shape of a sector and along its forward edge are teeth meshing with teeth in the periphery of pinion 70' secured to shaft 153; so that upon oscillation of the said sector, the pinion 70' is rotated and the sleeve 152 and the parts carried thereby moved back and forth along the shaft 153. The movement of the latch 149 toward the cam 151 and the shaft 147 is limited by the engagement of the lower end of the latch with a shoulder 187 formed on the bottom of the casing 50, this shoulder being arranged so that upon movement of the latch longitudinally of the shaft 153, the said latch can be moved laterally out of and back again into operative position with respect to the shoulder 150 on the cam 151. Means such as the spring 190 are best provided to yieldingly press latch 149 toward operative position with respect to the cam 151.

By means of this apparatus the shaft 30 is unlatched in the following manner whenever the auxiliary steering wheels are lowered or raised: When the sector 201 and lever 94 connected thereto are pulled to the left, referring to Fig. 9, lever 94 pulls wire 71 in the direction indicated by the arrow in Fig. 5, thereby turning the sleeve on shaft 30 to close the clutch 67—69 and at the same time rocking the member 70 downwardly so as to rotate pinion 70' and move latch 149 laterally out of engagement with the shoulder 150 upon the cam 151, the latch remaining out of engagement with the ratchet shoulder 150 as long as the sector 70 remains in its lowered position. While the latch is held in this released position the gear 146 is released so that the shaft 30 is free to rotate for lowering or raising the wheels according to the direction of rotation of said shaft. After the wheels have been raised, lever 94, as heretofore explained, is moved to the vertical position shown in Fig. 9, sector 70 being moved through pressure of spring 76, upwardly again to its original position moving pinion 70' and shaft 153 in the direction to shift latch 149 laterally back to locking position with respect to the ratchet shoulder 150 which will arrest further movement of the shaft 30.

When it is desired to start the engine, the control mechanism is in the normal position represented in the solid lines in Fig. 9 in which clutch 67—69 is open to disconnect shaft 30 from bevel gear 31, so that any rotation of the shaft thereafter will not raise or lower the wheels. The operator lifting the button 203 to cause button 204 to clear projection 207 then swings lever 87 to the left to pull wire 86'. The pull of this wire will rock actuating link 84 on its pivot 85 to move the cam member 80' and sliding member 113, as heretofore described, for closing engine shaft clutch and also clutch 62' to connect gear 54' to the shaft 30; but the swinging of link 84 also causes the left-hand end thereof to swing forward in the housing 50, thereby bringing the projection 84' thereon (see Figs. 4 and 5) into engagement with the lower end of latch 149 and swinging the same about sleeve 152 so as to release the same from ratchet shoulder 150 when gear 146 is free to be rotated under the power of the starter. The release of latch 149 has caused the upper end portion 149' thereof to be moved downwardly to such position that the inclined surface 184 thereof which is normally out of the path of the nose of the cam 151, will after a predetermined amount of rotation of the said cam and of the shaft 30 be engaged by the said nose whereupon the latch is automatically rotated by the said cam back into operative position at the same time moving lever 84 through its projection 84' back to neutral position and thus causing clutch 62' to be reopened and lever 87 to be moved back to its neutral position. Further rotation of cam 151 causes ratchet shoulder 150 to engage the latch shoulder, whereupon rotation of gear 146 is again stopped. The spring 190 is not of sufficient strength to move lever 84 and its connected mechanism back to neutral position. If the rotation of the engine shaft by the starter is not sufficient to start the engine, the operator moves lever 87 back again to the left in the same manner to cause projection 84' to again release latch 149, whereupon the engine is again driven by the starter through a predetermined distance. This operation may be repeated as many times as may be necessary to start the engine.

It will be understood from what has been described that since the shaft 30 is rotated in one direction by the engine to lower the wheels, and in the other direction to raise them, the starter spring 130 will be compressed when the shaft is rotating in one direction, and that it will be allowed to extend when the shaft is being rotated by the engine in the opposite direction; and according to the arrangement of the gear selected in the drawings, the spring will be compressed when the auxiliary wheels are being raised, and will be allowed to extend when they are being lowered. Since it requires the same number of revolutions of the differential shaft to lower the wheels as it does to raise them, the spring will be compressed and allowed to extend to the same extent for each of these respective operations.

The spring 130 may be compressed by the engine by raising button 203 (see Fig. 9) and moving the lever 87 to the right thereby pulling on wire 86 and causing cam 80 to close clutch 62, and also causing the closing of the clutch 97—98 whereupon the shaft 30 is rotated in a direction opposite that indicated by the arrows in Figs. 3 and 11, thereby causing the spring 130 to be compressed. Upon the automatic opening of clutch 97—98, lever 87 is, as explained, automatically returned to its central or neutral position. Over-compression of the spring 130 is, as heretofore explained, avoided by the ratchet connection and release mechanism described in connection with the drum 134.

If at any time it is desired to compress the spring manually, this is accomplished by ratchet-wheel 165 (see Figs. 11 and 15), keyed to shaft 30 at the inner end of the casing 52, which ratchet-wheel may be rotated by oscillation of a lever 166 rotatably mounted on shaft 30 and carrying a pivoted pawl 166' arranged to co-act with the teeth of the ratchet-wheel 165. A detent-pawl 166'', which may be pivoted to the housing 52 and co-acts with the teeth of the ratchet-wheel 165, is provided to prevent rotation of the shaft 30 by the spring 130 during the operation of the lever 166. When the spring is sufficiently wound the detent-pawl 166'' and pawl 166' are moved out of operative position with respect to the teeth of the ratchet-wheel 165, the shaft 30 being normally held against rotation by the engagement of the latch 149 with the ratchet-shoulder 150.

I have also provided means for starting the car motor from the seat of the vehicle in the event that for any reason the starting device described should be broken or otherwise get out of order. This device consists of a ratchet 168 mounted at the right-hand end of shaft 30 (see Figs. 13 and 11). Adjacent this ratchet-wheel an operating lever 169 is swiveled on the end of shaft 30 by means of a sleeve 170 fitting over the shaft. This lever carries a sliding ratchet bolt 171 guided by suitable guides 172 on the lever 169, and between one of these guides 172 and a collar 173 secured to the bolt, there is provided a compression spring 174 for thrusting the bolt out of engagement with the ratchet-wheel 168. The upward throw of the bolt is limited by a second collar 175. The lever 169 is normally held in the position shown in Fig. 13 by a coiled spring 176 connected at one end to the lower end of the lever and at the other end to a bracket 177 on casing 122. To the upper end of the lever there is pivoted a bell crank lever 178 one end of which is adapted to rest against the head of the bolt 171, and to the other end of this bell crank lever is secured a wire 179 running to the dash, so that when the operator pulls on this wire he holds the bolt firmly in engagement with the ratchet and moves the lever in a direction to turn the ratchet and shaft 30 through a part of a revolution to start the engine. If it does not start on the first movement of the lever, the operator releases wire 179, thus permitting the spring 176 to throw the lever forward, whereupon if wire 179 is again pulled, the shaft 30 is moved through another part of a revolution, and so on until the engine is started.

While I have described in detail the preferred embodiments of the various features of my invention, it will be obvious to those skilled in the art, after having understood my invention, that various changes and modifications may be made therein without departing from the spirit or scope of the invention, and I aim in the appended claims to cover all such modifications.

Having thus described my invention, what I claim as new and desire to secure by Letters Patent, is:—

1. In a vehicle, the combination of auxiliary steering means movable to various operative positions to steer the vehicle in different directions and comprising a wheel adapted to be lowered to and raised from the roadway, means for lowering said wheel to the roadway, a motor for actuating said means to lower the wheel, and means for automatically rendering the motor inoperative to move the wheel when the latter has been lowered to the roadway.

2. In a vehicle, the combination of auxiliary steering means movable to various operative positions to steer the vehicle in different directions and comprising a wheel adapted to be lowered to and raised from the roadway, means for lowering said wheel to the roadway, a motor for actuating said means to lower the wheel, a clutch for connecting said lowering means and motor, means for closing said clutch to make said connection, and means whereby said clutch is automatically operated to disconnect the motor and lowering means when the wheels have been lowered.

3. In a vehicle, the combination of auxiliary steering means comprising a pair of spaced wheels movable to various operative positions to steer the vehicle in different directions and adapted to be lowered to and raised from the roadway for lifting the adjacent wheels of the vehicle, means including a rack and worm for lowering the auxiliary steering wheels to the roadway, a motor for actuating said worm to lower the wheels, and means for automatically disconnecting the motor from the worm when the wheels have been lowered a predetermined distance.

4. In a vehicle, the combination of auxiliary steering means comprising a pair of spaced wheels movable to various operative positions to steer the vehicle in different directions and adapted to be lowered to and raised from the roadway for lifting the adjacent wheels of the vehicle, means including a rack and worm for lowering the auxiliary steering wheels to the roadway, a motor for actuating said worm to lower the wheels, a clutch for connecting and disconnecting the motor and worm, and means controlling said clutch to automatically release the same when the worm has been rotated a predetermined number of revolutions.

5. In a vehicle, the combination of auxiliary steering means comprising a pair of spaced wheels movable to various operative positions to steer the vehicle in different directions and adapted to be lowered to and raised from the roadway for lifting the adjacent wheels of the vehicle, means including gearing for lowering and raising the auxiliary steering wheels, a motor for actuating the gearing to raise and lower the wheels, clutch mechanism for connecting and disconnecting the motor and gearing, means under the control of the driver for closing the clutch to connect the motor and said gearing, and means for automatically releasing the clutch after the gearing has made a predetermined number of revolutions.

6. In a vehicle, the combination of auxiliary steering means comprising a pair of spaced wheels adapted to be lowered to and raised from the roadway for lifting the adjacent wheels of the vehicle, means including gearing for lowering and raising the auxiliary steering wheels, a motor for actuating the gearing to raise and lower the wheels, clutch mechanism for connecting and disconnecting the motor and gearing, means under the control of the driver for closing the clutch to connect the motor and said gearing, means for locking the clutch in its closed position, and means automatically operated when the clutch is closed for tripping the locking means after the auxiliary steering wheels have been moved a predetermined distance.

7. In a vehicle, the combination of auxiliary steering means comprising a wheel movable to various operative positions to steer the vehicle in different directions and adapted to be lowered to and raised from the roadway, means for lowering said wheel to the roadway, a motor for propelling the vehicle, a clutch for connecting and disconnecting the motor and said lowering means whereby the said means may be lowered by the motor, means under the control of the driver for closing said clutch to lower the wheels, and means for automatically releasing the clutch when the said wheels have been lowered to the roadway.

8. In a vehicle, the combination of a pair of auxiliary steering wheels each turnable about a separate vertical axis, means pivotally supporting said wheels from the vehicle so that they may swing up and down to be lowered to and raised from the roadway, a gear on said means movable with the same about the pivotal axis of said supporting means, a shaft having a gear for driving said first gear, means including gearing for rotating the shaft in either direction for lowering and raising the wheels, a motor, and means for connecting the motor to the gearing, said means comprising a driving shaft connected to the gearing and a clutch between said driving shaft and motor, means under the control of the driver for closing the clutch and for connecting the gearing with the first-mentioned shaft for raising or lowering the wheels, and means for automatically releasing the clutch and disconnecting the gearing from said first shaft when the driving shaft has made a predetermined number of revolutions.

9. In a vehicle, the combination with steering means connected with the main front wheels, of auxiliary steering means comprising a normally raised auxiliary road-wheel mounted on the vehicle adapted to be swung vertically so as to be lifted off of and lowered to the roadway, a separate upright axis for the auxiliary wheel about which the wheel is swung to steer the car when the wheel is lowered to the roadway, a gear connected with said auxiliary wheel to turn therewith about said vertical axis and a rack meshing with said gear to turn the same about said axis, means for effecting the vertical swinging movement of said auxiliary wheel, and means for automatically connecting said rack and normal steering means when the auxiliary wheel is lowered, and for disconnecting the same when said wheel is raised.

10. In a vehicle, the combination with steering means connected with the main front wheels, of auxiliary steering means comprising a normally raised auxiliary road-wheel mounted on the vehicle adapted to be swung vertically so as to be lifted off of and lowered to the roadway, a separate upright axis for the auxiliary wheel about which the wheel is swung to steer the car when the wheel is lowered to the roadway, a gear connected with said auxiliary wheel to turn therewith about said vertical axis and a rack meshing with said gear to turn the same about said axis, means for lowering said wheel to the roadway, a motor for actuating said means to lower the wheel, means for automatically disconnecting the motor and lowering means when the wheel has been lowered to the roadway, and means for connecting and disconnecting said rack and normal steering means whereby the auxiliary steering wheel may be operated from said normal steering means.

11. In a motor vehicle, the combination of one or more auxiliary steering wheels, means on which said steering wheels are mounted, said means being pivotally supported from the vehicle to swing up and down to lower said wheels to and raise them from the roadway, a shaft geared to said wheel-supporting means for swinging the same about the pivot thereof, a second shaft geared to said last shaft, gearing comprising a main gear and two pinions, means under the control of the driver for connecting one or the other of said pinions to said second shaft for rotating the same in either direction, a motor for driving said main gear, and means under the control of the driver for governing the application of the motive power to said gear.

12. In a motor vehicle, the combination of one or more auxiliary steering wheels, means on which said steering wheels are mounted, said means being pivotally supported from the vehicle to swing up and down to lower said wheels to and raise them from the roadway, a shaft geared to said wheel-supporting means for swinging the same about the pivot thereof, a second shaft geared to said last shaft, gearing comprising a main gear and two pinions, means under the control of the driver for connecting one or the other of said pinions to said second shaft for rotating the same in either direction, a motor, a clutch for connecting said motor and main gear, and means for automatically releasing the clutch after the wheels have been lowered.

13. In a motor vehicle, the combination of one or more auxiliary steering wheels, means on which said steering wheels are mounted, said means being pivotally supported from the vehicle to swing up and down to lower said wheels to and raise them from the roadway, a shaft geared to said wheel-supporting means for swinging the same about the pivot thereof, a second shaft geared to said last shaft, gearing comprising a main gear and two pinions, means under the control of the driver for connecting one or the other of said pinions to said second shaft for rotating the same in either direction, a motor, a clutch for connecting said motor and main gear, and means for automatically releasing said clutch after the wheel-supporting means has been raised or lowered.

14. In a motor vehicle, the combination of one or more auxiliary steering wheels, means on which said steering wheels are mounted, said means being pivotally supported from the vehicle to swing up and down to lower said wheels to and raise them from the roadway, a shaft geared to said wheel-supporting means for swinging the same about the pivot thereof, a second shaft geared to said last shaft, gearing comprising a main gear and two pinions, clutch mechanism for connecting one or the other of the pinions to the second shaft, a motor, a clutch for connecting said motor with the main gear, means under the control of the driver for closing said last clutch and for operating the first-mentioned clutch mechanism for connecting one or the other of the pinions to the shaft, and means automatically operated for releasing the motor and pinion clutch after the wheels have been raised or lowered.

15. In a motor vehicle, the combination of one or more steering wheels, means for carrying said steering wheels, said means being supported from the vehicle to move up and down to lower said wheels to and raise them from the roadway, a shaft connected to said movable supporting means for moving the same, a motor, and means including a plurality of clutches under the control of the driver for connecting said motor and shaft for lowering the wheels, a starting device for said motor, means connecting said starting device to said motor at a point between said clutches, and means under the control of the driver for releasing the clutch nearest said wheel-carrying means when the starter is used to start the engine to prevent the starter from operating said wheel-carrying means.

16. In a motor vehicle, the combination of one or more steering wheels, means for carrying said steering wheels, said means being pivotally supported from the vehicle to swing up and down to lower said wheels to and raise them from the roadway, a shaft geared to said swinging support for moving the same about its pivot, a second shaft geared to said first shaft, gearing including a main gear and two pinions for driving said second shaft, a motor for driving said main gear, a clutch for connecting said motor and main gear, means under the control of the driver for closing said clutch, a starting device geared to said second shaft for driving the motor through said gearing, a second clutch for operatively connecting said second shaft with said first shaft, and means under the control of the driver for releasing said last clutch when the starting device is operated to drive the motor.

17. In a motor vehicle, the combination of one of more steering wheels means for carrying said steering wheels, said means being pivotally supported from the vehicle to swing up and down to lower said wheels to and raise them from the roadway, a shaft geared to said swinging support for moving the same about the pivot thereof, a second shaft geared to said first shaft, gearing including a main gear and two pinions for driving said second shaft, a motor for driving said main gear, a clutch for connecting said motor and main gear, means under the control of the driver for closing said clutch, a starting device for the motor, means operatively connecting said starting device with said second shaft for driving the motor from the starting device and for storing energy in the starting device when the motor is operated, a second clutch for operatively connecting said second shaft with said first shaft, means under the control of the driver for releasing said last clutch when the starting device is operated to drive the motor, and means for interrupting the connection between said second shaft and starting device after the starting device has had a predetermined amount of energy stored therein.

In testimony whereof, I have signed my name to this specification.

MANUEL DE ARRIGUNAGA.